United States Patent [19]

Krueger et al.

[11] Patent Number: 4,505,371

[45] Date of Patent: Mar. 19, 1985

[54] FAN-SHAPED LOADER FOR MAKING A LOOSELY FELTED MAT OF ALIGNED WOOD FLAKES

[75] Inventors: Gordon P. Krueger, Hancock; Anders E. Lund; Roy D. Adams, both of Houghton, all of Mich.

[73] Assignee: Board of Control of Michigan Technological University, Houghton, Mich.

[21] Appl. No.: 365,601

[22] Filed: Apr. 5, 1982

[51] Int. Cl.³ .............................................. B65G 47/24

[52] U.S. Cl. ...................................... 198/382; 198/493

[58] Field of Search ............... 198/458, 394, 400, 493, 198/380-382, 771; 406/108; 222/637

[56] References Cited

U.S. PATENT DOCUMENTS 3,469,672 9/1969 Stutske et al. ...................... 198/771

3,478,861 11/1969 Elmendorf .......................... 198/383

3,963,400 6/1976 Urmanov ............................ 425/224

4,053,066 10/1977 Lynch ............................. 198/493 X

*Primary Examiner*—Joseph E. Valenza

*Assistant Examiner*—Dennis Williamson

[57] ABSTRACT

Apparatus for forming an elongated continuous mat of elongated wood flakes mixed with a binder and adapted to be compressed to form a densified composite wood product for continuously depositing wood flakes on that supporting surface and for aligning the elongated wood flakes being deposited in mutually parallel relation and in alignment with the direction of movement of the supporting surface. A hopper for containing wood flakes deposits wood flakes into the upper end of a fan-shaped flake loader comprised of a plurality of channels positioned in side-by-side relation and sloping downwardly from the hopper to a supporting surface. The channels are generally V-shaped in cross-section and converge toward their lower ends such that the wood flakes deposited in the upper ends of the channels become aligned in mutually parallel relation as the flakes slide down the channels and are deposited on the supporting surface.

4 Claims, 4 Drawing Figures

Fig. 3
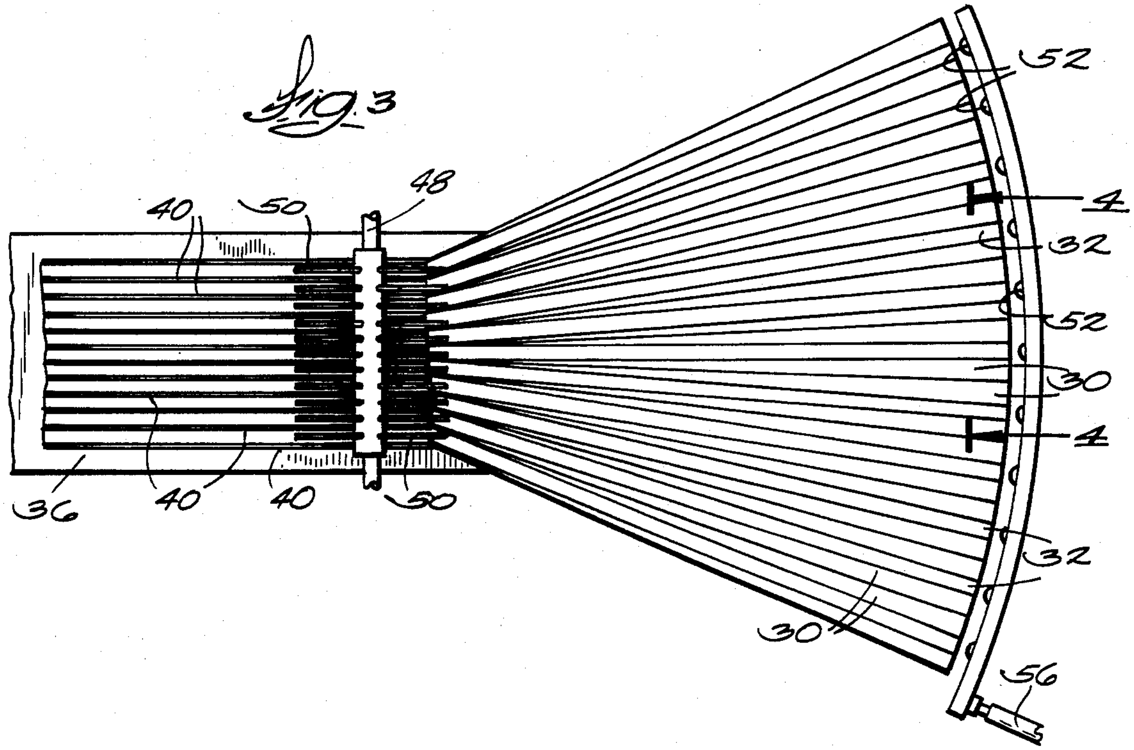
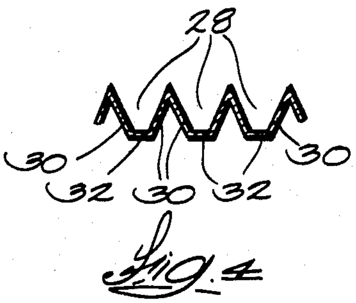
Fig. 4

FAN-SHAPED LOADER FOR MAKING A LOOSELY FELTED MAT OF ALIGNED WOOD FLAKES

FIELD OF THE INVENTION

The invention relates to compressed wood particle products and more particularly to apparatus for prealigning and transporting randomly oriented wood flakes in a continuous manner in connection with formation of a loosely felted mat of aligned wood flakes, the mat being adapted to be compressed to form a composite wood product.

BACKGROUND PRIOR ART

As set forth in the Lund et al. U.S. Pat. No. 4,241,133, issued Dec. 23, 1980 and assigned to the assignee of the present invention, it has been found to be desirable in the construction of compressed or composite wood particle products to employ wood flakes which are very thin and which have a length at least several times their width and to align the wood flakes in mutually parallel alignment and in alignment with the longitudinal axis of the product being produced. This produces a product having substantially improved strength characteristics in the direction of alignment of the wood flakes. The production of such compressed wood products formed from an assembly of wood particles first requires the formation of a loosely felted mat of wood particles. The mat is then compressed to form a densified panel or board. One problem encountered in forming the loosely felted mat is that the alignment or orientation of the elongated wood flakes is made difficult because the wood flakes, which are very light and comparatively fragile, have to be handled en masse, and this has resulted in the clogging of the known machines that were tried for this purpose.

Examples of prior art attempts to design suitable apparatus for forming mats of aligned wood strands are set forth in the Elmendorf U.S. Pat. No. 3,478,861, issued Nov. 18, 1969; the Elmendorf U.S. Pat. No. 3,220,743, issued Aug. 24, 1965; the Turner et al. U.S. Pat. No. 3,721,329, issued Mar. 30, 1973; the Urmanov U.S. Pat. No. 3,963,400, issued June 15, 1976; and Canadian Pat. No. 597,941, issued May 10, 1960.

Attention is also directed to the Hostettler U.S. Pat. No. 3,226,764, issued June 4, 1966; the Hostettler U.S. Pat. No. 3,070,838, issued Jan. 1, 1963; the Carlsson et al. U.S. Pat. No. 3,692,612, issued Sept. 19, 1972; the Paerels et al. U.S. Pat. No. 3,372,217, issued Mar. 5, 1968; the Axer et al. U.S. Pat. No. 3,824,058, issued July 16, 1974; and the Chapman U.S. Pat. No. 2,992,152, issued July 11, 1961.

Attention is further directed to the Zilver U.S. Pat. No. 2,972,404, issued Feb. 21, 1961; the Hendrickson U.S. Pat. No. 3,387,695, issued June 11, 1968; and the Kane et al. U.S. Pat. No. 3,452,400, issued July 1, 1959.

SUMMARY OF THE INVENTION

The invention includes apparatus for forming an elongated continuous mat of elongated wood flakes mixed with a binder and adapted to be compressed to form a densified composite wood product. The apparatus of the invention includes a means for providing a continuously moving mat supporting surface and means for continuously depositing wood flakes on that supporting surface and for aligning the elongated wood flakes being deposited in mutually parallel relation and in alignment with the direction of movement of the supporting surface. The means for continuously feeding and aligning includes a hopper for containing wood flakes and a fan-shaped flake loader comprised of a plurality of channels positioned in side-by-side relation and sloping downwardly from the hopper to the supporting surface. The channels are generally V-shaped in cross-section and converge toward their lower ends such that wood flakes deposited in the upper ends of the channels become aligned in mutually parallel relation as the flakes slide down the channels to the supporting surface.

Various other features and advantages of the invention will be apparent from the following description of a preferred embodiment, from the claims, and from the drawings.

BRIEF DESCRIPTION OF THE DRAWINGS

FIG. 3 is a cross section view taken along line 3—3 in FIG. 1.

FIG. 4 is a cross section view taken along line 4—4 in FIG. 3.

Figure 2:
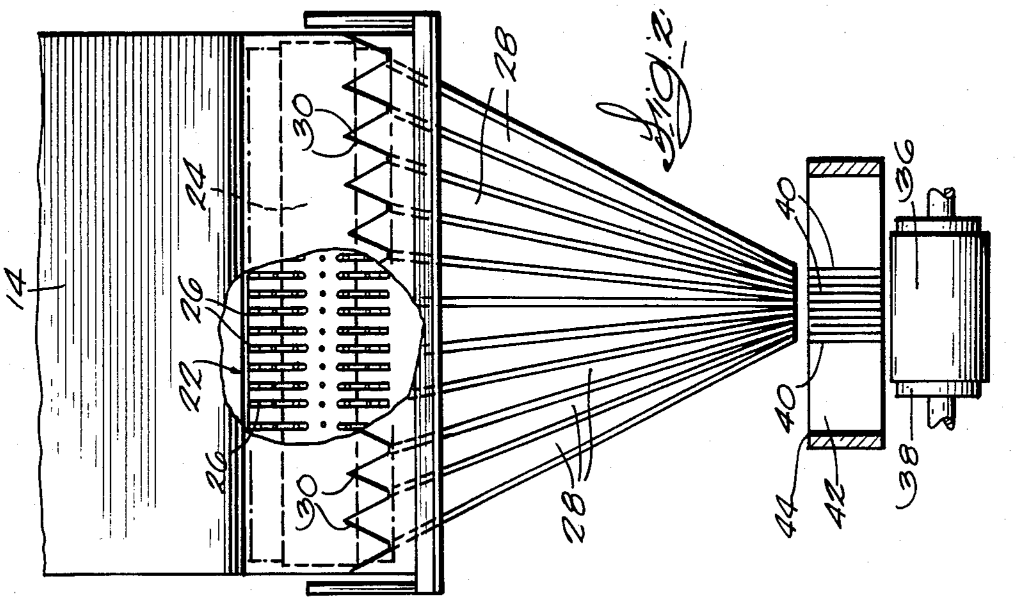
FIG. 2 is an end elevation view of the apparatus illustrated in FIG. 1 with portions broken away in the interest of clarity.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figure 1:
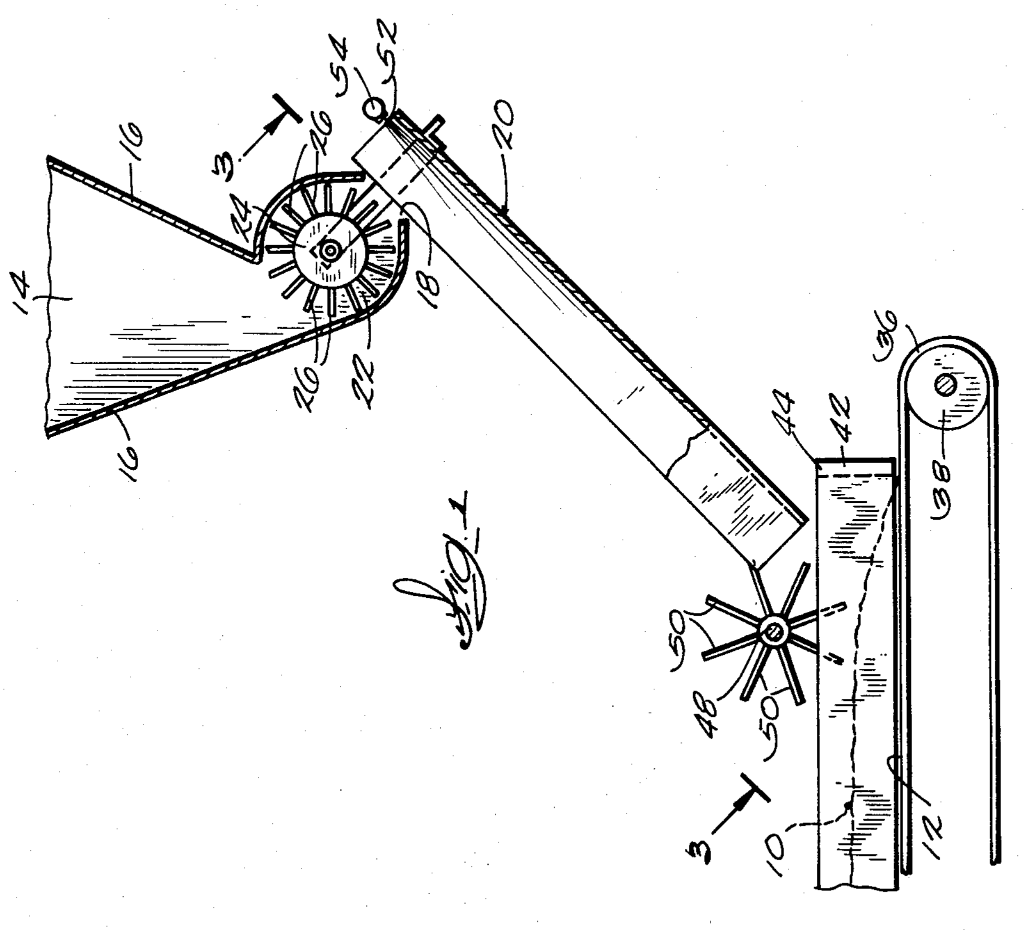
FIG. 1 is a side elevation view, and with portions broken away, of apparatus embodying the present invention and for forming a loosely felted mat of aligned wood flakes.

Illustrated in FIG. 1 is an apparatus for forming an elongated continuous loosely felted mat 10 comprised of elongated wood flakes and a binder, this mat 10 being adapted to be placed in a press (not shown) and to be compressed therein to form a densified composite wood product such as is illustrated, for purposes of example, in the Lund et al. U.S. Pat. No. 4,241,133.

The apparatus illustrated in FIG. 1 includes a means for depositing a furnish comprised of a mixture of elongated wood flakes and a binder onto a supporting surface 12 as the supporting surface moves continuously beneath the means for depositing and thereby forms a loosely felted mat of flakes on the supporting surface. In the preferred embodiment, the furnish is comprised of a mixture of wood flakes and a binder material as set forth in the U.S. Lund et al. patent referred to above. It is preferred that the wood flakes be oriented in the loosely felted mat in mutually parallel relation and in parallel relation to the longitudinal axis of the product to be formed to thereby produce a compressed wood product having improved strength characteristics. Additionally, it is preferred that the wood flakes of the furnish should have an average length of about 0.5 inch to about 3.5 inches, and preferably about 1 inch to about 2 inches, an average thickness of about 0.01 to about 0.05 inch, preferably about 0.015 to about 0.025 inch and most preferably about 0.02 inch. Flakes longer than about 3.5 inches tend to curl and this hinders proper alignment of the flakes during the formation of a mat. It is also difficult to insure that flakes shorter than about 0.5 inch do not become aligned with their grain direction crosswise. Flakes thinner than about 0.01 inch tend to require excessive amounts of binder to be mixed with these flakes if an adequate bonding of the flakes is to occur. Flakes thicker than about 0.05 inch are relatively stiff and tend to require excessive compression in order to obtain the desired intimate contact therebetween. In any given batch, some of the flakes can be shorter than 0.5 inch and some can be longer than 3.5 inches so long as the overall average length of the flakes is within the above range. The same is true for the thickness. To facilitate proper alignment of the flakes, it is preferred that the flakes should have a length which is several times the width and preferably about 4 to about 10 times. Using this constraint as a guide, the average width of the flakes generally should be about 0.1 to 0.5 inches.

The furnish is formed by introducing flakes of the size described above into a conventional blender wherein predetermined amounts of a binder are applied to the flakes as they are tumbled or agitated in the blender. Suitable binders include those used in the manufacture of particle board and similar pressed particle products. Such binders may include organic polyisocynantes including those curable at room temperature or urea formaldehyde.

Referring again to the means for depositing the furnish onto the supporting surface, that apparatus includes a hopper 14 adapted to contain a quantity of wood flakes in spaced relation above the supporting surface. The hopper can be open at the top for receiving wood flakes and includes side walls 16 which slope downwardly and converge. The hopper 14 includes an elongated opening 18 adjacent its bottom, the opening 18 being positioned immediately above the upper end of a fan-shaped flake funnel assembly 20, the flake funnel assembly 20 being adapted to convey wood flakes from the hopper 14 to the supporting surface 12.

Means are also provided in the bottom of the hopper 14 for evenly distributing the wood flakes across the upper portion of the fan-flake funnel assembly 20 and for providing a uniform continuous controlled flow of flakes from the hopper 14 to the funnel assembly 20. While the means for distributing the flakes could have various constructions, in the illustrated arrangement, it includes a picker roll or picker wheel 22 housed in a lower portion of the hopper 14 adjacent the opening 18. The picker wheel 22 includes a central cylinder 24 having a plurality of pins or fingers 26 extending radially outwardly from the surface of the cylinder 24. Means are also provided for causing rotation of the picker wheel 22 so as to cause flakes from the hopper 14 to be fed through the opening 18.

Referring more particularly to the fan-shaped funnel assembly 20, it comprises a means for pre-aligning and transporting randomly oriented wood flakes dispursed by the hopper 14 to a discharge point adjacent the supporting surface 12 of the conveyor and in a continuous manner. More particularly, it is comprised of a plurality of channels 28 positioned in side-by-side adjacent relation and each extending downwardly from a position closely adjacent and beneath the discharge opening 18 of the hopper 14 to a position closely adjacent the upper surface 12 of the conveyor. While the fan-shaped funnel assembly 20 may be constructed in various ways, in the illustrated construction it is comprised of a single piece of sheet metal shaped to have the illustrated form.

The channels 28 of the fan-shaped loader are each generally V-shaped in cross section, as shown in FIG. 4, and include planar side walls 30 joined at their lower edges by a planar bottom wall 32, and the side walls 30 being sloped upwardly and outwardly. The channels 28 are also formed such that the width of the channels adjacent their upper edges is approximately 5 times the width of the channels at their ends adjacent the supporting surface. This taper in the width of the channels gives the fan-flake funnel assembly 20 it's fan like configuration with the assembly being approximately 5 times as wide as its upper end as it is at it's lower end.

In operation of the fan-shaped funnel assembly 20 the flakes dispensed by the picker wheel 22 through the opening 18, are evenly distributed across the width of the upper end of the fan-flake funnel assembly. The flakes will fall into the upper portions of the channels 28, and as they fall toward the bottom of the channels, the downwardly sloping side walls 30 will cause the flakes to become mutually aligned with the side walls. The flakes will then slide down the channels. Since the channels 28 converge, the flakes will be funneled together as they reach the discharge ends of the channels, and they will be aligned in mutually parallel relation and with the longitudinal axes of the flakes being parallel to the longitudinal axis of the mat 10 being formed.

In the illustrated construction the supporting surface 12 beneath the discharge end of the fan-shaped funnel assembly 20 is formed by the upper belt flight of a conveyor belt 36 supported at its opposite ends by rollers 38 (one shown) and being continuously driven such that as flakes are deposited on the supporting surface from the discharge end of the fan-shaped funnel assembly 20, they form a continuous mat 10 which can be conveyed by the conveyor belt 36 to a suitable press where the loosely felted mat so formed is compressed to form a compressed composite wood product.

Means are also provided between the discharge end of the fan shaped funnel assembly 20 and the supporting surface 12 of the conveyor belt 36 for maintaining alignment of the flakes as they are deposited on the supporting surface. In the illustrated construction, this means includes a plurality of parallel baffles 40 (FIGS. 2 and 3) each defining a vertical plane, being positioned in closely spaced adjacent relation, and being aligned with the direction of movement of the supporting surface 12. More particularly, the baffles 40 comprise planar metal plates supported by the end walls 42 of a supporting frame 44. The baffles 40 are spaced apart by a distance greater than the widths of the flakes defined above but sufficiently close together that the flakes will be held in substantially parallel alignment when they are disposed between the baffles. As also illustrated in the drawings, the upper edges of the baffles are positioned closely adjacent the lower or discharge end of the fan-shaped funnel assembly 20 such that the flakes being deposited on the supporting surface 12 are not allowed to become misaligned as they fall from the discharge end. Misalignment of the flakes is also prevented by positioning the lower edges of the baffles closely adjacent the supporting surface 2 of the conveyor. The baffles 40 are also positioned beneath the discharge ends of the channels 28 such that the flakes passing through the discharge ends of the channels will fall between pairs of the baffles 40.

Means are further provided at the discharge end of the fan-shaped funnel assembly 20 for insuring the flakes deposited by the funnel assembly fall between the baffles and to prevent potential clogging of the flakes on the upper edges of the baffles or in the discharge ends of the channels 28. In the illustrated construction, such means includes a rotatable shaft 48 adapted to rotate in the clockwise direction as viewed in FIG. 1 and having a plurality of pins 50 projecting radially outwardly from the shaft 48 and positioned so as to extend downwardly between the upper edges of the baffles 40. The pins or fingers 50 are adapted to move between the baffles causing any flakes lying across the baffles to be aligned with the baffles 40 so that they will fall between the baffles.

Means are further provided for generating a flow of air in the channels 28 from their upper ends toward the discharge ends. In the illustrated arrangement this means comprises a plurality of air jet nozzles 52 positioned adjacent the upper ends of the channels 28 and directing air longitudinally down the channels. The air jet nozzles 52 are connected to an air pipe 54 curved around the upper end of the fan flake loader, the air pipe 54 being connected, in turn, to a source of compressed air by an air line 56.

Various features of the invention are set forth in the following claims.

We claim:

1. Apparatus for forming an elongated loosely felted mat of thin elongated wood flakes with said flakes being aligned in mutually parallel relation and being aligned with the longitudinal direction of the elongated mat, said apparatus comprising:

means defining a mat supporting surface, means for depositing wood flakes on said supporting surface, said means for depositing including means for holding a quantity of wood flakes, means for feeding wood flakes from said holding means to said supporting surface and for causing said flakes to be aligned in substantially parallel side-by-side relation, said means for feeding and aligning including means defining a plurality of downwardly sloping adjacent side-by-side channels, said channels each including an upper end positioned beneath said holding means and adapted to receive wood flakes from said holding means, and a lower end positioned above said supporting surface, each of said channels including opposed side walls, said side walls having upper edges and lower edges, said side walls each sloping upwardly and outwardly from said lower edges such that said upper edges are mutually spaced apart, and said channels converging in width from said upper ends to said lower ends so that wood flakes deposited from said hopper converge as they move down said channels, means for causing wood flakes in said holding means to be deposited in the upper ends of said channels, means for directing air jets down said channels for causing movement of flakes in said upper ends down said channels, and means positioned between said lower ends of said channels and said supporting surface for maintaining mutually parallel alignment of said wood flakes as said wood flakes are deposited by the lower end of said channels onto said supporting surface, said means for maintaining alignment including a plurality of parallel closely spaced parallel baffles, said baffles defining vertical planes substantially parallel to the longitudinal axis of the loosely felted mat being formed.

2. Apparatus as set forth in claim 1 wherein said means for directing air jets down said channels includes a plurality of nozzles, respective ones of said nozzles directing air down respective ones of said channels, and means for connecting said nozzles to an air pressure source.

3. Apparatus as set forth in claim 1 wherein said hopper includes an opening positioned above the upper ends of said channels, said opening extending across the width of said upper ends of said channels, and means for causing uniform disbursement of wood flakes through said opening.

4. Apparatus as set forth in claim 1 wherein said baffles define a plurality of narrow generally vertical cavities, respective ones of said cavities being positioned beneath said lower ends of respective ones of said channels.

* * * * *